United States Patent
Kaup

(10) Patent No.: US 7,283,675 B1
(45) Date of Patent: *Oct. 16, 2007

(54) METHOD AND DEVICE FOR ENCODING AND DECODING A DIGITIZED IMAGE

(75) Inventor: André Kaup, Höhenkirchen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/423,458

(22) PCT Filed: May 5, 1998

(86) PCT No.: PCT/DE98/01255

§ 371 (c)(1),
(2), (4) Date: Nov. 8, 1999

(87) PCT Pub. No.: WO98/51085

PCT Pub. Date: Nov. 12, 1998

(30) Foreign Application Priority Data

May 7, 1997   (DE) ................................ 197 19 383

(51) Int. Cl.
*G06K 9/46* (2006.01)

(52) U.S. Cl. ........................ 382/236; 382/232; 382/250

(58) Field of Classification Search ................ 382/239, 382/250, 236, 233, 232, 268, 276, 238, 248; 375/240.1, 240.2
See application file for complete search history.

(56) References Cited

U.S. PATENT DOCUMENTS

| | | | |
|---|---|---|---|
| 5,631,977 A * | 5/1997 | Koshi et al. ................ 382/239 |
| 5,719,961 A * | 2/1998 | Normile et al. ............. 382/239 |
| 5,974,184 A * | 10/1999 | Eifrig et al. ................. 382/236 |
| 5,990,956 A * | 11/1999 | Lee .............................. 382/250 |
| 5,991,453 A * | 11/1999 | Kweon et al. ............... 382/250 |
| 5,995,668 A * | 11/1999 | Corset et al. ................ 382/233 |
| 6,035,073 A * | 3/2000 | Kaup .......................... 382/276 |
| 6,115,503 A * | 9/2000 | Kaup .......................... 382/268 |
| 6,208,768 B1* | 3/2001 | Pandel et al. ................ 382/300 |
| 6,272,254 B1* | 8/2001 | Kaup .......................... 382/236 |
| 6,341,144 B1* | 1/2002 | Haskell et al. ........... 375/240.2 |
| 6,408,025 B1* | 6/2002 | Kaup ..................... 375/240.02 |
| 6,452,970 B1* | 9/2002 | Kaup ...................... 375/240.1 |

FOREIGN PATENT DOCUMENTS

DE   OS 37 28 444   9/1989
DE   OS 39 25 663   7/1991

(Continued)

OTHER PUBLICATIONS

Itoh et al, Adaptive Transform Coding of Images Based on Variable-Shape-Blocks.

(Continued)

*Primary Examiner*—Duy M. Dang
(74) *Attorney, Agent, or Firm*—Bell, Boyd & Lloyd LLP

(57) ABSTRACT

For an edge image block, the DC part of the encoding information of the picture elements contained in the edge image block is separately determined and is subtracted from the encoding information of the picture elements of the edge image block, as a result whereof an enhanced coding efficiency is achieved.

28 Claims, 4 Drawing Sheets

FOREIGN PATENT DOCUMENTS

| | | |
|---|---|---|
| EP | 0 739 141 A2 | 10/1996 |
| EP | 0 871 335 A2 | 10/1998 |
| JP | 07240922 A | 9/1995 |
| JP | 08294119 A | 5/1996 |
| JP | 09214971 A | 8/1997 |

OTHER PUBLICATIONS

Bi et al, Discrete Cosine Transform.

Kauff et al, "An Extension of Shape-Adaptive DCT (SA-DCT) Toward DC Separation and ΔDC Correction".

Sikora et al, Shape-Adaptive DCT for Generic Coding of Video.

Le Gall, "MPEG: A Video Compression Standard For Multimedia Applications".

Wallace, "The JPEG Still Picture Compression Standard".

Liou, "Overview of the PX64 kbit/s Video Coding Standard".

ITU-T Draft H.263, "Video Coding For Low Bitrate Communication".

Netravali et al, "Motion-Compensated Television Coding: Part 1".

ISO/IEC JTC1/SC29/WG11, "MPEP-4 Video Verification Model Version 2.0".

I. Matsuda and S. Itoh, "DCT coding of still images based on variable-shape-blocks", Proceedings of 5$^{th}$ International Conference on High Technology, World Techno Fair in Chiba '96, Sep. 11, 1996; p. 204-211.

T. Sikora "Low complexity shape-adaptive DCT for coding of arbitrarily shaped image segments", Signal Processing: Image Communication, Elsevier, vol. 7. No. 4-6, Nov. 1995, p. 381-395.

D-146 Matsuda, Ichiro et al. "A Study on Transform Image Coding Based on Variable Shape Blocks Using DCT" Faculty of Science and Technology, Schience University of Tokyo, 1992.

MPEG-4 Video Verification Model Version 7.0, ISO/IEC JTC1/SC29/WG11, MPEG97/N1642, XP002144264, pp. 56-60, Apr. 1997.

\* cited by examiner

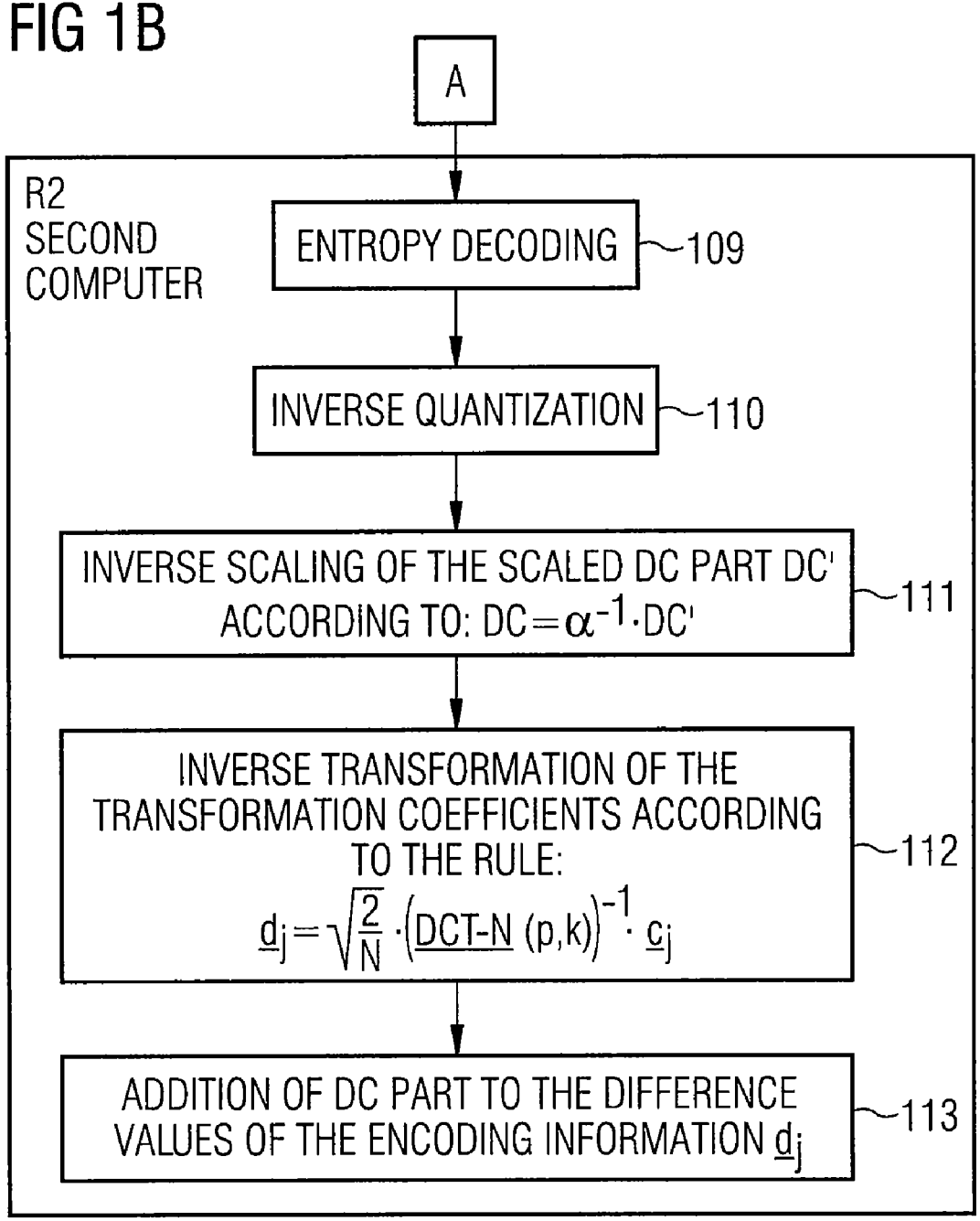

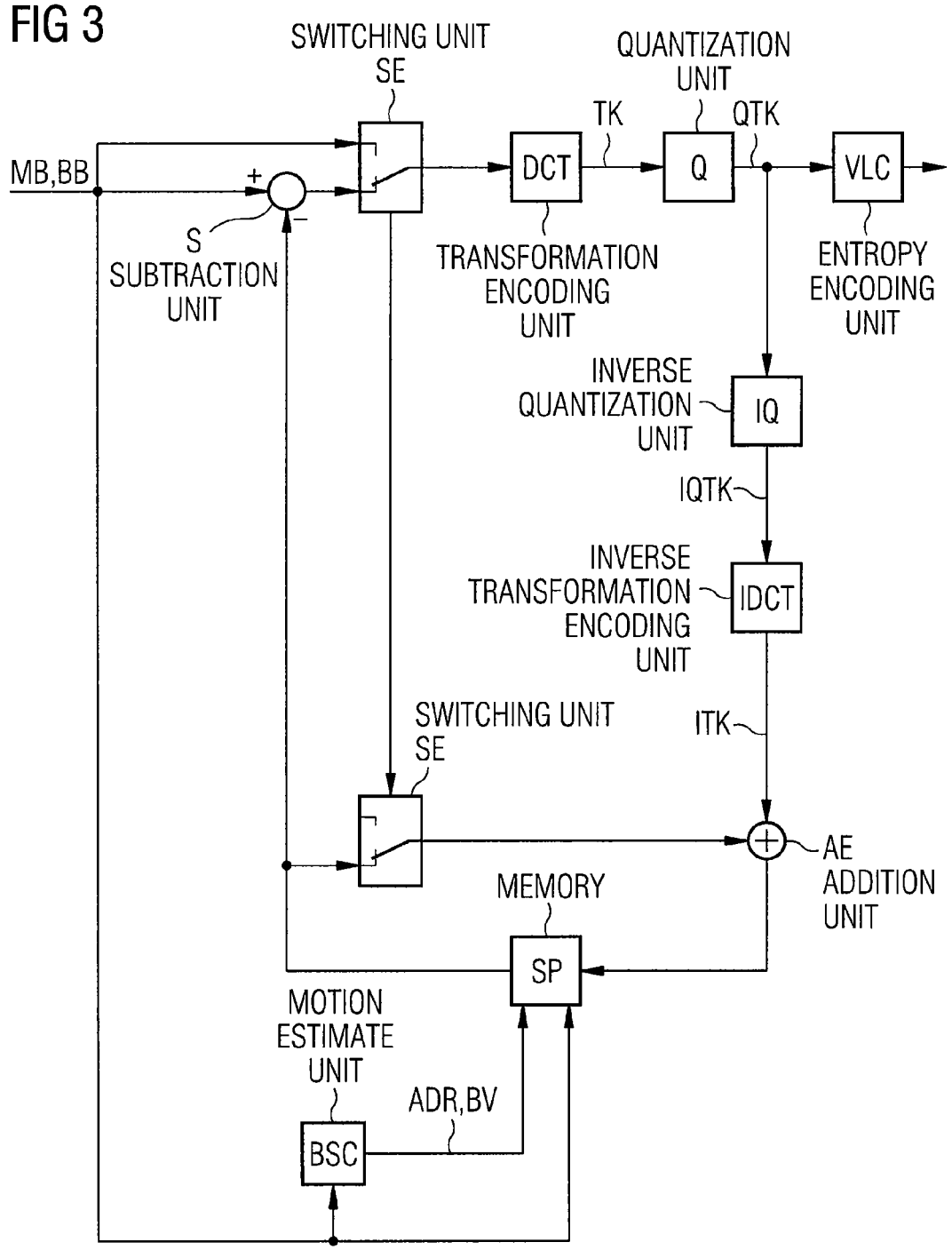

METHOD AND DEVICE FOR ENCODING AND DECODING A DIGITIZED IMAGE

BACKGROUND OF THE INVENTION

1. Field of the Invention

The invention is directed to the encoding and decoding of a video data stream that contains digitalized images.

2. Description of the Prior Art

The encoding of video signals according to the image encoding standard MPEG (MPEG1, MPEG2) [1], JPEG [2], H.261[3], H.263[4] is based on the principle of what is referred to as block-based image encoding.

The block-based image encoding methods employ principles of prediction encoding and of transformation encoding.

In the prediction, difference images are generated by subtraction of predicted image data from the original image data to be encoded.

What is referred to as motion-compensated prediction is employed for the prediction. The fundamentals of the motion estimation required for this purpose and their application for motion-compensated prediction are known to those skilled in the art, such as is disclosed in the article "Motion—Compensated Television Coding: Part I" by Netravali and Roberts. The motion estimation ensues such for an image block to be encoded includes comparing luminance information (brightness information) that is respectively allocated to a picture element of the image of the image block to be encoded to stored luminance information of an area having the same shape in a chronologically preceding image. The comparison usually continues by obtaining the absolute difference of the individual luminance values. The comparison for the image block to be encoded is applied to a plurality of regions of the preceding image that are referred to below as preceding image blocks. The difference images contain the difference between the luminance values of the image block and the luminance values of the preceding image block that coincides "best" in the motion estimation.

The topical correlations between neighboring picture elements present in the difference images are utilized with the assistance of a suitable transformation, such as a discrete cosine transformation (DCT—for example). The transformation encoding that is employed supplies transformation encoding coefficients that are subjected to a quantization and to an entropy encoding.

Subsequently, the transformation encoding coefficients are transmitted to a receiver, wherein the entire encoding method is implemented in an inverse manner. As a result, direct information about the picture elements is, in turn, available at the receiver after implementation of the decoding.

A distinction is made between two different image encoding modes in block-based image encoding methods.

In what is referred to as the intra-image encoding mode, the entire image or a suitable sub-portion of the image (for example, an image block) is respectively encoded with the entire encoding information allocated to the picture elements of the image and is transmitted. What are referred to as I-images or I-image blocks are encoded in this mode.

In what is referred to as the inter-image encoding mode, only the respective difference image information of two chronologically successive images is encoded and transmitted. In this mode, what are referred to as P-images or B-images or P-image blocks or B-image blocks are encoded.

What is to be understood by encoding information below is brightness information (luminance information or color information) (chrominance information) that is allocated to the picture elements of the image.

Methods for what is referred to as object-based image encoding are known from ISO/IEC JTC1/SC29/WG11, MPEG-4 Video Verification Model published by the International Organization for Standardization (ISO). In object-based image encoding, a segmentation of an image is performed according to the image objects occurring in the image. The image objects are separately encoded. Methods for motion estimation and transformation encoding are likewise utilized given this method.

Given object-based image encoding methods, each image object BO is first resolved into image blocks BB having a fixed size, for example 8×8 picture elements BP. After the resolution, some of the resulting image blocks are completely located within an image object BO, as shown in FIG. 4. The image B contains at least one image object BO that is bounded with an object edge OA of the image object BO.

Image blocks BB that contain at least a part of the object edge OK are referred to below as edge image blocks RBB.

Image blocks BB that are located completely within an image object BO after the resolution can—based on the aforementioned block-based image encoding methods—be transformation-encoded with a standard, block-based, discrete cosine transformation (DCT).

The edge image blocks RBB, however, must be encoded with a separate method.

Previously, there have been two fundamental approaches for encoding the edge image blocks RBB.

The ISO publication discloses that the encoding information of the picture elements of the image object BO within an edge image block RBB be supplemented by a suitable extrapolation method of the encoding information onto the area of the complete edge image block RBB. This procedure is referred to as padding. The supplemented area is subsequently encoded with a standard, two-dimensional, discrete cosine transformation.

Alternatively, it is known from The ISO publication and the article "Shape Adaptive DCT for Generic Coding of Video" by Sidora and Makai that the image object BO is transformed separately according to lines and columns. This technique is referred to as shape-adapted transformation encoding, as shape-adapted DCT when a DCT is employed (Shape Adaptive DCT, SA-DCT). The DCT coefficients allocated to the image object BO are determined such that the picture elements BP of an edge image block RBB that do not belong to the image object BO are masked out. A one dimensional DCT whose length corresponds to the number of remaining picture elements BP in the respective column is then initially applied column-by-column onto the remaining picture elements BP. The resulting DCT coefficients are horizontally aligned and are subsequently subjected to a further one-dimensional DCT in horizontal direction with a corresponding length.

The rule of SA-DCT known from the teachings of Sikora and Mikai is based on a transformation matrix D T-N having the following structure:

$$DCT-N(p,k) = Y \cdot \cos\left[p \cdot \left(k + \frac{1}{2}\right)\right] \cdot \frac{\pi}{N}\bigg] k \cdot p = 0 \rightarrow N - 1$$

The value $$\gamma = \frac{1}{\sqrt{2}}$$

applies to the case p=0 and γ=1 applies to all other cases.

N refers to a size of the image vector to be transformed wherein the transformed picture elements are contained.

DCT-N refers to a transformation matrix having the size N×N.

Indices are referenced p, k, with p, k ∈ [0, N−I].

According to SA-DCT, each column of the image block to be transformed is vertically transformed according to the rule $$\underline{c} = 2 \cdot \frac{2}{N} \cdot \underline{DCT-N} \, x_j$$

and the same rule is subsequently applied onto the resulting data in horizontal direction.

One disadvantage of SA-DCT is that none of the resulting transformation coefficients (spectral coefficients) represents the constant part of the encoding information of the picture elements BP of the image object BO. The constant component, which is also referred to as the DC coefficient, however, already contains the majority part of the signal energy given ordinary image data and is therefore, of particular significance for an efficient image encoding.

SUMMARY OF THE INVENTION

The invention is in part based on the problem of specifying methods and arrangements for encoding and decoding digitized images by which more efficient encoding and decoding becomes possible.

In a method according to preferred embodiment of the present invention, the picture elements are grouped into image blocks. A DC portion of the encoding information of the picture elements contained in at least one part of the image block is determined for at least are part of an image block and the DC portion is subtracted from the encoding information of every picture element of the at least one of the image block. The encoding information of the picture elements of the image block reduced by the DC part is ultimately subjected to a transformation encoding.

According to another embodiment of the present invention, a method according to patent claim 8 for decoding a digitized image comprises at least one image object having an arbitrary plurality of picture elements to which transformation-encoded encoding information is allocated, whereby the picture elements are grouped into image blocks and at least a part of the image block has a DC portion of the encoding information of the picture elements contained in the image block allocated to it, the transformation-encoded encoding information of the picture elements of the at least one part of the image block to which a DC part is allocated is subjected to an inverse transformation encoding. The DC part is added to the encoding information of each picture element of the at least part of the image block.

An apparatus for encoding digitized images according to an embodiment of the present invention; comprises a processor unit that is configured such that the unit groups a plurality of picture elements to form at least one image block. The processor unit then is configured to determine the DC portion of encoding information allocated to the plurality of picture elements and subtracts the DC portion from the encoding information to achieve a subtraction result. Finally, the processor unit transforms the subtraction result using a shape-adaptive transformation encoding to achieve transformed encoded information.

An apparatus for decoding digitized images according to another embodiment comprises a processor unit that is configured such that the processor unit performs inverse transformation of a plurality of picture elements that have been shape-adaptive transformation encoded and then adds a DC portion for each picture element to the inverse transformation encoded information to achieve an addition result.

The apparatus of the present invention can be a universal computer with a programmable microprocessor, the processor unit. The encoding or, respectively, decoding of the digitalized images in this case ensues upon execution of a computer program, which is programmed such that the corresponding method steps are implemented by the computer. The logic units of the encoder or, respectively, decoder described below are fashioned, for example, as independent procedures of the computer program in this case.

In another embodiment, an apparatus of the present invention can also be specific hardware modules, for example a specific computer card for digital image processing that respectively contains a specific module for the logic units of the encoder or, respectively, the decoder described below.

One advantage of the methods and the apparatuses is that a substantial savings of needed transmission capacity for the transmission of an image or, respectively, an increased compression of the image data is achieved due to the separate determination of the DC part and reduction of the encoding information of the picture elements of the respective image block or a part thereof.

Another advantage is that the method of the present invention makes possible to utilize an orthonormal version of the SA-DCT, as will be described later. This leads to a further-improved encoding efficiency, i.e. the image quality is substantially increased given an unaltered data rate.

The invention can be graphically seen therein that the DC part of the encoding information of the picture elements contained in an edge image block is separately determined for the edge image block and is subtracted from the encoding information of the picture elements of the edge image block, an enhanced encoding efficiency being achieved as a result thereof.

In the method for encoding in the present invention, it is advantageous to implement the transformation encoding such that the signal energy of the encoding information of the picture elements in the location domain is approximately equal to the signal energy of the transformed encoding information of the picture elements in the frequency domain.

It is advantageous, given the above transformation encoding, to form transformation coefficients $c_j$ from difference values $d_j$ of the encoding information of the picture elements according to the following rule:

$$\underline{c}j = \sqrt{\frac{2}{N}} \cdot \underline{DCT-N}(p,k), \underline{d}_j$$

wherein $d_j$ references the difference values between the encoding information and the DC part, N references a quantity of an image vector to be transformed wherein the picture elements $x_j$ are contained, DCT-N and references a transformation matrix having the size n×N, p, k indicate indices with p, k ∈ [0, N−1].

The encoding efficiency is substantially enhanced as a result of the above described, orthonormal version of the SA-DCT.

In the methods for decoding according to the present invention, it is correspondingly advantageous to implement the inverse transformation encoding such that the signal energy of the encoding information of the picture elements in the location domain is approximately equal to the signal energy of the transformed encoding information of the picture elements in the frequency domain.

It is advantageous, given the above inverse transformation encoding, to form difference values $d_j$ from the transformation coefficients $c_j$ according to the following rule:

$$d_j = \sqrt{\frac{2}{n}} \cdot (DCT-N(p,k))^{-1} \cdot c_j$$

wherein

N references a quantity of an image vector to be transformed wherein the picture elements $x_j$ are contained, DCT-N references a transformation matrix having the size N×N, p, k reference indices with p, k ∈ [0, N−1], and $(\bullet)^{-1}$ references an inversion of the matrix.

The methods of the present invention are particularly suitable for encoding image blocks that contain an object edge of an image object, these being referred to below as edge image blocks.

DESCRIPTION OF THE DRAWINGS

The attached drawings show a preferred embodiment of the invention, which is explained in greater detail below.

FIGS. 1A and 1B illustrate a flowchart in which the individual method steps of the method for encoding and of the method for decoding are shown.

FIG. 3 is a sketch of a standard arrangement for block-based image encoding with the logic units.

DESCRIPTION OF THE PREFERRED EMBODIMENTS

Figure 2:
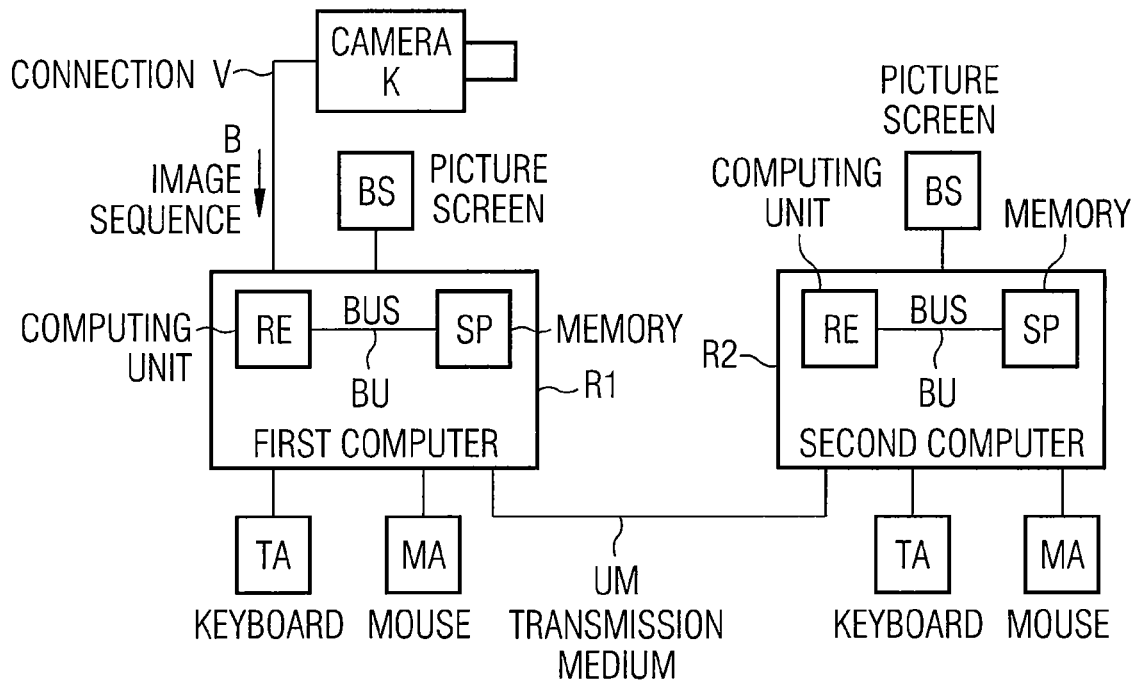
FIG. 2 is a sketch of a computer arrangement having two computers, a camera and a transmission medium for the pickup, encoding, transmission and decoding of image data.

FIG. 2 shows a camera K with which a sequence of images B is registered and supplied to a first computer R1 via a connection V.

In the first computer R1, the images of the sequence of images B are digitized and encoded according to the method of the future MPEG4 Standard described in the above-referenced ISO publication.

The first computer R1 is connected to a second computer R2 via a transmission medium UM, such as a cable or a radio transmission link, for example. The image data encoded by the first computer R1 is transmitted to the second computer R2 via the transmission medium UM and is decoded at the second computer R2.

The first computer R1 and the second computer R2 are respectively comprised of a memory SP and a computing unit RE or processor that are connected to one another via a bus BU. The computing unit RE of the first computer R1 decodes the method steps explained below for encoding the digitalized images are implemented. The computing RE of the second computer R2 is fashioned such that the received encoded data according to the MPEG2 method. The first computer R1 and the second computer R2 also respectively comprise a picture screen BS for displaying the images B as well as a keyboard TA and a mouse MA for controlling the computers R1, R2.

A segmentation of an image B according to the image objects BO occurring in the image B within the framework of MPEG4. The image objects BO are separately encoded.

Figure 4:
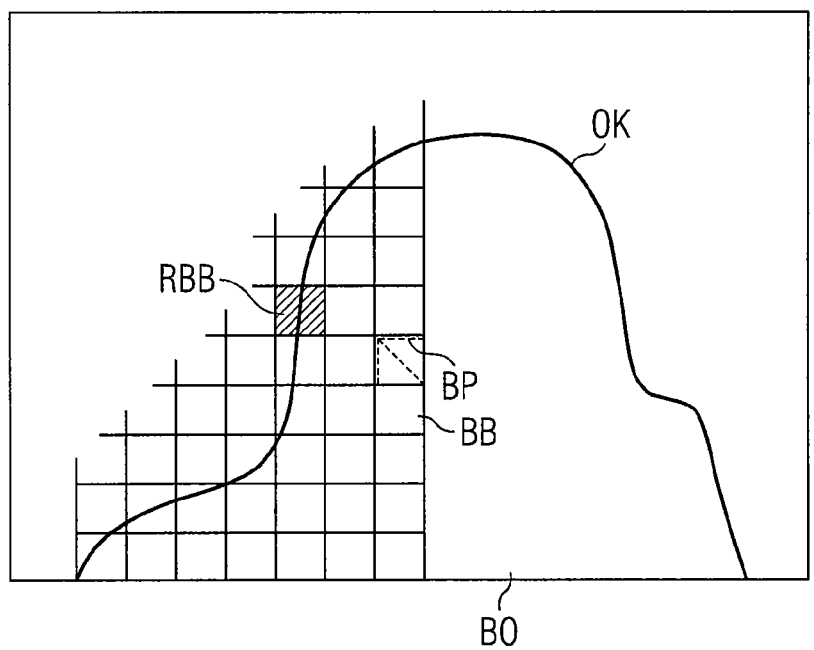
FIG. 4 is a symbolic illustration of an image having an image object and image blocks and edge image blocks.

For encoding an image object BO, the image object BO is first resolved into image blocks BB having a fixed size, 8×8 picture elements BP in this case. After the resolution is performed, a part of the resulting image blocks lie completely within the image object BO (e.g., BB) as shown in FIG. 4. The image B contains at least one image object BO that is bounded with an object edge OK of the image object BO.

Image blocks BB that are completely located within the image object BO after the resolution is performed can, based on the aforementioned block-based image encoding methods, be transformation-encoded with an ordinary block-based, discrete cosine transformation (DCT) with the apparatus shown in FIG. 3.

The image blocks BB are encoded in an intra-image encoding mode or in an inter-image encoding mode. Two switch units SE are provided for switching between these two modes.

For implementation of the intra image inter-image encoding mode, a subtraction unit S is provided wherein luminance information of picture elements of a predicted image block PBB (explained later) is subtracted from the luminance information of the picture elements BP of the image block BB.

A difference image block DBB derived as a result of the difference formation is supplied to a unit for transformation encoding DCT in which a discrete cosine transformation (DCT) is applied to the difference image block DBB for deriving of transformation coefficients TK. The transformation coefficients TK are quantized QTK in a quantization unit Q. The quantized transformation coefficients QTK are supplied to an entropy encoding unit VLC for entropy encoding wherein run length encoding or variable length encoding (variable length coding) is implemented.

In the encoding, the quantized transformation coefficients QTK are also supplied to inverse quantization unit IQ for inverse quantization wherein inverse quantized transformation coefficients IQTK are formed.

In an inverse transformation encoding unit IDCT for inverse transformation encoding, the inversely quantized transformation coefficients IQTK supplied to unit IDCT are inversely transformed. Inverse transformation coefficients ITK derived from the inverse transformation are supplied to an addition unit AE.

The predicted image block PBB is also supplied to the addition unit AE. The predicted image block PBB contains predicted transformation coefficients that are added to the inverse transformation coefficients ITK. Reconstructed transformation coefficients RTK derived from the addition of the predicted image block PBB and the inverse transformation coefficients ITK are stored in a memory SP.

At least one chronologically preceding, reconstructed image is respectively stored in the memory SP. The preceding image comprises preceding image blocks with the reconstructed transformation coefficients RTK that represent preceding luminance information of preceding picture elements BP of the preceding image.

The image stored in the memory SP is employed for motion estimation that is implemented in a motion estimate unit BSC.

The motion estimating BSC performs motion estimation such that a comparison of the luminance information to luminance information for the picture elements BP of a respective image block BB of picture elements BP of the preceding image is implemented. Respectively preceding picture elements in the preceding image are employed that are grouped into a preceding image block.

An absolute difference of the luminance information of the picture elements BP that are contained in the image block BB and luminance information of picture elements of a region in the preceding image that exhibits the same shape as the image block BB is formed for the image block BB. The difference is referred to below as error, as discussed below.

The error criterion is formed for an image block BB according to the following rule:

$$F = \sum_{i=1, j}^{8} |x_{ij} - y_{ij}|,$$

wherein i references a line index for unambiguous identification of a line within the image block BB;

j references a line index for the unambiguous identification of a column within the image block BB;

$x_{ij}$ references a luminance value that is allocated to picture element BP within the image block BB that is located at the position indicated by i, j;

$y_{ij}$ references a luminance value that is allocated to a preceding picture element BP within the region of the preceding image that is compared to the image block BP and that is located at the position indicated by i, j.

The error criterion is formed for a prescribed plurality of regions within the preceding image, the plurality of regions referred to as the search region.

As a result of the motion estimating if the motion estimating unit BSC, the region of the preceding image B having the minimum error criterion is selected as predicted image block PBB, since the coincidence with the image block BB is optimum for this region.

Within the framework of the motion estimating, the topical shift of the image block BB relative to the predicted image block PBB in the preceding image is identified. The shift is referred to below as motion vector BV.

Within the framework of the motion estimating of the motion estimating unit BSC, an address ADR is supplied to the memory SP for the respectively unambiguous addressing of the region of the preceding image.

The motion vector BV is stored in the memory SP after motion estimating has been completed.

The luminance values of the picture elements of the predicted image PBB are supplied to the subtraction unit S and are subtracted from the luminance values of the picture elements BP of the image block BB.

In the intra-image encoding mode, the image blocks BB are completely subjected to the DCT, quantized and entropy-encoded. A motion estimating by motion estimating unit BSC is not performed while in this mode.

The edge image blocks RBB, however, must be encoded with a special method. An embodiment of the invention is described below for edge image blocks RBB and for the intra-image encoding mode.

FIG. 1 shows a flowchart wherein the individual steps of the method, are indicated.

Figure 1A:
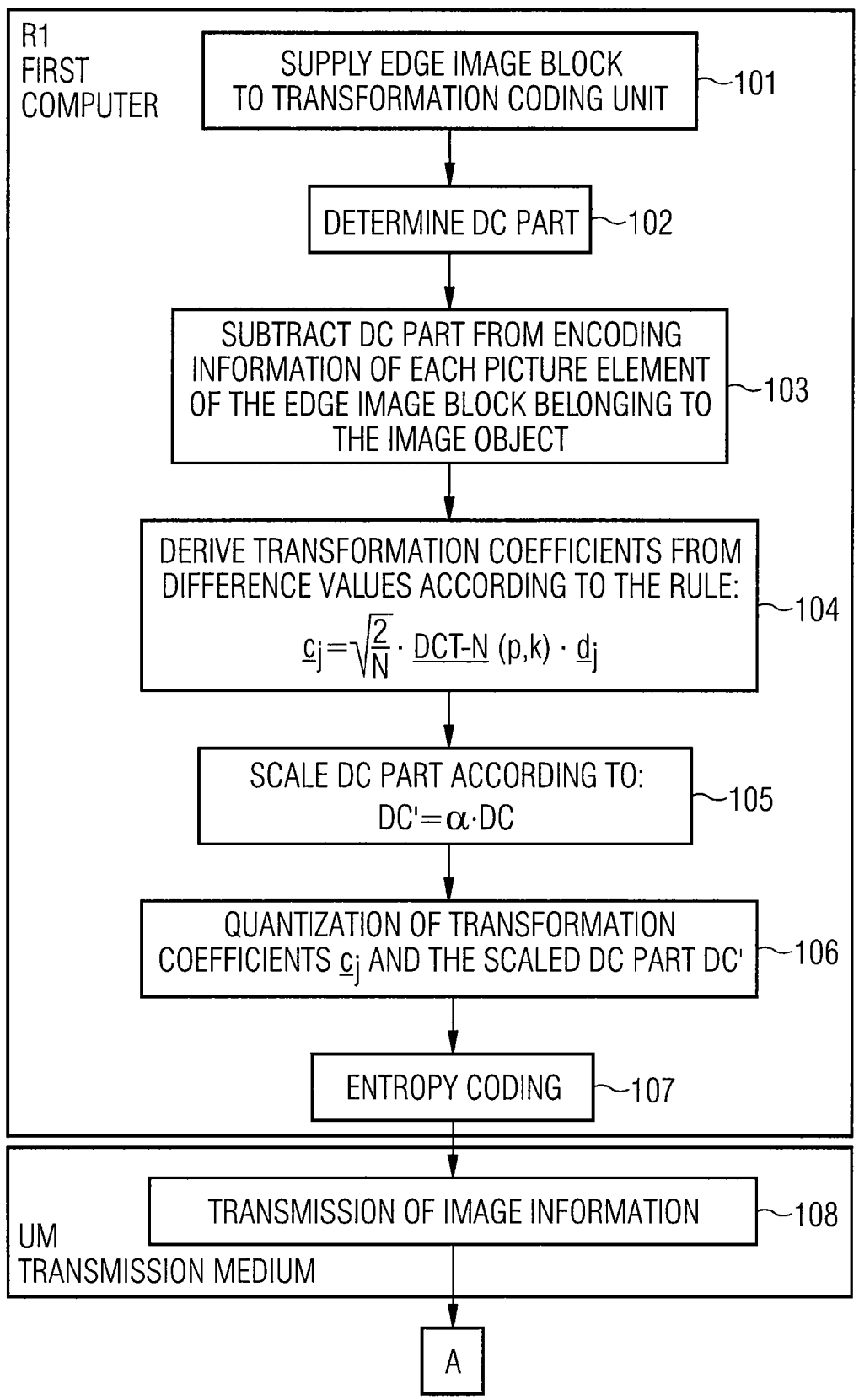

In a first step 101, shown in FIG. 1A, an edge image block RBB is supplied to the unit for transformation encoding DCT in the intra-image encoding mode.

In the unit for transformation encoding DCT, a DC portion "DC" of the encoding information of the picture elements BP of the edge image block RBB is determined at step 102, the picture elements belonging to the image object BO. The DC portion DC is formed according to the following rule:

$$DC = \frac{1}{N} \cdot \sum_{i,j \in BO} f(i, j),$$

wherein

N references a plurality of picture element BP of the edge image block RBB belonging to the image object BO and f(i, j) references the value of the encoding information that is allocated to the picture element BP located at the position indicated by the indices i, j.

In a third step 103, the determined DC part DC is subtracted from the encoding information of each picture element BP of the edge image block RBB that belongs to the image object BO.

Difference values d(i, j) of the encoding information f(i, j) each picture element at a position (i, j) within the edge image block RBB, are derived according to the following rule:

$$d(i,j) = f(i,j) - DC \forall (i,j) \in BO.$$

In step 104, difference values d(i, j) are subjected to a version of the SA-DCT. The difference once values d(i, j) of the encoding information of the picture elements are combined to form a difference vector $d_j$, which is used to derive the transformation coefficients $c_j$ according to the following rule:

$$\underline{c}_j = \sqrt{\frac{2}{N}} \cdot \underline{DCT - N}(p, k) \cdot \underline{d}_j$$

wherein

N references a quantity of an image vector to be transformed wherein the picture elements BP are contained;

DCT-N references a transformation matrix having the size N×N;

p, k reference indices with p, k ∈ [0, N−1].

As can be seen, the rule for forming the transformation coefficients $c_j$ means that the signal energy of the encoding information of the picture elements BP in the location domain is approximately equal to the signal energy of the transformed encoding information of the picture elements BP in the frequency domain.

In step 105, DC part DC is multiplied by a prescribed factor α to form a scaled DC part DC' according to the relationship:

DC'=αDC.

A value for the factor α=sqrt(n) has proven advantageous, wherein n is the plurality of picture elements BP in the edge image block RBB belonging to the image object BO.

The transformation coefficients $c_j$ and the scaled DC part DC' are quantized in and subjected to an entropy encoding (step 107).

The encoded image information is transmitted from the first computer R1 to the second computer R2 via the transmission medium UM (step 108).

In the second computer R2, as shown in FIG. 1B, encoding images are received, and image decoding is implemented for the edge image blocks RBB according to the method steps to be described later. The other image blocks (i.e., non-edge image blocks) are decoded with the standard inverse methods relative to encoding (i.e. an entropy decoding), an inverse quantization is performed inverse transformation encoding and, potentially, motion compensation.

With respect to image decoding of the edge image blocks, each edge image block RBB is likewise subjected to an entropy decoding (step 109) and to an inverse quantization (step 110).

The DC part DC is reconstructed from the co-transmitted, scaled DC part DC' by multiplication with the reciprocal $\alpha^{-1}$ of the factor α as shown in step 111.

In a further step 112, the difference values d(i, j) are determined from inversely quantized transformation coefficients $c_j$. The difference values d(i, j) of the encoding information of the picture elements are to form a difference vector $d_j$, which is derived from the transformation coefficients $c_j$ according to the following rule:

$$d_j = \sqrt{\frac{2}{N}} \cdot (DCT-N(p,k))^{-1} \cdot c_j$$

In a last step 113, the DC part DC is again added to the difference values d (i, j) of the encoding information of the picture elements, the original encoding information of the picture elements having thus been reconstructed and the edge image block being thus decoded.

A few alternative embodiments to the above-described exemplary embodiment are disclosed below.

The invention is not limited to the method according to MPEG-4. It can be advantageously utilized for any object-based image encoding method since the problem of encoding or decoding edge image blocks always arises in these methods, this problem being advantageously solved by the invention.

The invention can be employed for any block-based or object-based transformation encoding that itself supplies no DC part, for example discrete sine transformation (DST) or a wavelet transformation as well.

The invention is not limited to the above-described version of SA-DCT. SA-DCT can also be unitized unmodified within the scope of the invention.

The invention can obviously be seen therein that the DC part of the encoding information of the picture elements contained in the edge image block is separately determined for an edge image block and is subtracted from the encoding information of the picture elements of the edge image block, and that increased coding efficiency is achieved as a result thereof.

What is claimed is:

1. A method for encoding a digitized image comprising at least one image object having a plurality of picture elements, wherein encoding information is allocated to the plurality of picture elements, the method comprising the steps of:
    grouping the plurality of picture elements to form at least one image block;
    determining a DC portion of the encoding information allocated to the plurality of picture elements contained in at least one part of the at least one image block;
    subtracting the DC portion from the encoding information allocated to the plurality of picture elements of the at least one part of the at least one image block containing an edge of the image object to achieve a subtraction result; and
    transforming the subtraction result by a shape-adaptive transformation encoding to achieve transformed encoding information.

2. The method according to claim 1, wherein the transformation encoding is performed such that signal energy of the encoding information of the picture elements of the at least one part of the at least one image block within a location domain is substantially equal to signal energy of the transformed encoding information of the picture elements of the at least one part of the at least one image block within a frequency domain.

3. The method according to claim 1, wherein the subtraction result is comprised of a plurality of difference values $d_j$, and transformation coefficients $c_j$ are generated from the plurality of difference values $d_j$ according to the equation:

$$c_j = \sqrt{\frac{2}{N}} \cdot DCT-N(p,k) \cdot d_j$$

wherein N is a quantity of an image vector to be transformed in which the picture elements are contained, DCT-N is a transformation matrix of size N*N, and p,k are indices where p,k ∈ [0, N−1].

4. The method according to claim 1, wherein the step of subtracting the DC portion from the encoding information is only applied to edge image blocks that are encoded during an intra-image encoding mode.

5. The method according to claim 1, further comprising the step of:
    scaling the DC portion.

6. A method for decoding a digitized image comprised of at least one image object having a plurality of picture elements, wherein the plurality of picture elements have been shape-adaptive transformation encoded into transformed encoding information, the plurality of picture elements are grouped to form at least one image block and a DC portion of encoding information of picture elements contained within the at least one image block is allocated to the at least one image block, the method comprising steps of:
    inverse transformation encoding the plurality of picture elements having been shape-adaptive transformation encoded for at least one part of the at least one image block to achieve inverse transformed encoding information; and
    adding the DC portion to each picture element of the at least one image block containing an edge of the image object and having been inverse transformation encoded to achieve an addition result.

7. The method according to claim 6, wherein inverse transformation coding is performed such that signal energy of the encoding information of the picture elements of the at least one part of each edge image block within a location domain is substantially equal to signal energy of the transformed encoding information of the picture elements of the at least one part of each edge image block within a frequency domain.

8. The method according to claim 6, wherein the addition result is comprised of a plurality of difference values $d_j$, that are generated from transformation coefficients $c_j$ contained within the transformed encoding information to the equation:

$$d_j = \sqrt{\frac{2}{N}} \cdot (\underline{DCT - N}(p, k))^{-1} \cdot \underline{c}_j$$

wherein N is a quantity of an image vector to be transformed in which the picture elements are contained, DCT-N is a transformation matrix of size N*N, and p,k are indices where p,k $\in$ [0, N−1] and $(*)^{-1}$ is an inverse of a matrix.

9. The method according to claim 6, wherein the step of adding the DC portion to each picture element which has been inverse transformation encoded is only applied to edge image blocks that are encoded during an intra-image encoding mode.

10. The method according to claim 6, wherein the DC portion is scaled.

11. An apparatus for encoding a digitized image having at least one image object that is comprised of a plurality of picture elements that are allocated encoding information, the apparatus comprising:
 a processor unit configured to:
 group the plurality of picture elements to form at least one image block;
 determine a DC portion of the encoding information allocated to the plurality of picture elements contained in at least one part of the at least one image block;
 subtract the DC portion from the encoding information allocated to the plurality of picture elements of the at least one part of the at least one image block containing an edge of the image object to achieve a subtraction result; and
 transform the subtraction result by shape-adaptive transformation encoding to achieve transformed encoding information.

12. The apparatus according to claim 11, wherein the processor unit is further configured to perform transformation encoding such that signal energy of the encoding information of the picture elements of the at least one part of the at least one image block within a location domain is substantially equal to signal energy of the transformed encoding information of the picture elements of the at least one part of the at least one image block within a frequency domain.

13. The apparatus according to claim 11, wherein the processor unit is configured to derive the subtraction such that the subtraction result is comprised of a plurality of difference values $d_j$, and transformation coefficients $c_j$ are generated from the plurality of difference values $d_j$ according to the equation:

$$\underline{c}_j = \sqrt{\frac{2}{N}} \cdot \underline{DCT - N}(p, k) \cdot \underline{d}_j$$

wherein N is a quantity of an image vector to be transformed in which the picture elements are contained, DCT-N is a transformation matrix of size N*N, and p,k are indices where p,k $\in$ [0, N−1].

14. The apparatus according to claim 11, wherein the processor unit is configured such that subtraction of the DC portion from the encoding information is only applied to edge image blocks that are encoded during an intra-image encoding mode.

15. The apparatus according to claim 11, wherein the processor unit is configured to scale the DC portion.

16. An apparatus for decoding a digitized image comprised of at least one image object having a plurality of picture elements, wherein the plurality of picture elements have been shape-adaptive transformation encoded into transformed encoding information, the plurality of picture elements are grouped to form at least one image block and a DC portion of encoding information of picture elements contained within the at least one image block is allocated to the at least one image block, the apparatus comprising:
 a processor unit configured to:
 inverse transformation encode the plurality of picture elements having been shape-adaptive transformation encoded for at least one part of the at least one image block to achieve inverse transformed encoding information; and
 add the DC portion to each picture element of the at least one image block containing an edge of the image object and having been inverse transformation encoded to achieve an addition result.

17. The apparatus according to claim 16, wherein the processor unit performs inverse transformation coding such that signal energy of the encoding information of the picture elements of the at least one part of each edge image block within a location domain is substantially equal to signal energy of the transformed encoding information of the picture elements of the at least one part of each edge image block within a frequency domain.

18. The apparatus according to claim 16, wherein the processor unit is configured to derive the addition result such that the addition result is comprised of a plurality of difference values $d_j$, that are generated from the transformed encoding information according to the equation:

$$\underline{d}_j = \sqrt{\frac{2}{N}} \cdot (\underline{DCT - N}(p, k))^{-1} \cdot \underline{c}_j$$

wherein N is a quantity of an image vector to be transformed in which the picture elements are contained, DCT-N is a transformation matrix of size N*N, and p,k are indices where p,k $\in$ [0, N−1] and $(*)^{-1}$ is an inverse of a matrix.

19. The apparatus according to claim 16, wherein the processor unit is configured such that addition of the DC portion to each picture element having been inverse transformation encoded is only applied to edge image blocks that are encoded during an intra-image encoding mode.

20. The apparatus according to claim 16, wherein the processor unit is configured to scale the DC portion.

21. An apparatus for encoding a digitized image, the image comprised of at least one image object having a plurality of picture elements, at least one portion of the picture elements being grouped into at least one image block, comprising:

a processing unit including:
an processing unit input receiving the at least one image block comprised of the at least one portion of the plurality of picture elements;
a first switching unit connected to the input, the first switching unit having first and second input contacts and corresponding first and second switching positions, and an output;
a subtraction unit connected between the processing unit input and the second input contact of the first switching unit;
a transformation encoding unit connected to the output of the first switching unit for encoding the image block according to a prescribed transformation; and
a memory connected to the processing unit input and to the subtraction unit, the memory storing luminance information of a preceding image block;
wherein the subtraction unit subtracts luminance information of the at least one image block from the luminance information of the preceding image block stored in the memory; and
wherein the first switching unit is in the first position connecting the processing unit input to the transformation encoding unit when the processing unit is operating in a first mode, and the first switching unit is in the second position connecting the subtraction unit to the transformation encoding unit when the processing unit is operating in a second mode.

22. The apparatus according to claim 21, further comprising:
an inverse transformation encoding unit connected to an output of the transformation encoding unit for decoding the encoded image block and outputting decoded image information;
an addition unit connected to an output of the inverse transformation encoding unit; and
a second switching unit having first and second switching positions that is connected to the first switching unit so that the switching positions of the second switching unit correspond to the switching positions of the first switching unit, the second switching unit connected to the addition unit, the subtraction unit and the memory;
wherein the second switching unit connects to the memory to the addition unit when the processing unit is operating in the second mode and the luminance information of the preceding image block is added to the decoded image information.

23. The apparatus according to claim 21, wherein the first mode is an inter-image encoding mode and the second mode is an intra-image encoding mode.

24. The apparatus according to claim 21, wherein the prescribed transformation is a shape-adaptive discrete cosine transformation.

25. A method for encoding a digitized image, the image comprised of at least one image object having a plurality of picture elements, at least one portion of the picture elements being grouped into at least one image block, comprising:
receiving the at least one image block comprised of the at least one portion of the plurality of picture elements at an input of a processing unit;
transmitting the at least one image block to a first switching unit connected to the input of the processing unit, the first switching unit having first and second input contacts and corresponding first and second switching positions, and an output;
encoding the image block according to a prescribed transformation via a transformation encoding unit;
storing luminance information of a preceding image block in a memory; and
subtracting luminance information of the at least one image block from the luminance information of the preceding image block stored in the memory, wherein the first switching unit is in the first position connecting the processing unit input to the transformation encoding unit when the processing unit is operating in a first mode, and the first switching unit is in the second position connecting the subtraction unit to the transformation encoding unit when the processing unit is operating in a second mode.

26. The method according to claim 25, further comprising:
decoding the encoded image block and outputting decoded image information via an inverse transformation encoding unit connected to an output of the transformation encoding unit;
transmitting the decoded image block to an addition unit connected to an output of the inverse transformation encoding unit; and
providing a second switching unit having first and second switching positions that is connected to the first switching unit so that the switching positions of the second switching unit correspond to the switching positions of the first switching unit, the second switching unit connected to the addition unit, the subtraction unit and the memory;
wherein the second switching unit connects to the memory to the addition unit when the processing unit is operating in the second mode and the luminance information of the preceding image block is added to the decoded image information.

27. The method according to claim 25, wherein the first mode is an inter-image encoding mode and the second mode is an intra-image encoding mode.

28. The method according to claim 25, wherein the prescribed transformation is a shape-adaptive discrete cosine transformation.

* * * * *